United States Patent [19]

Nilssen

[11] Patent Number: 5,210,788
[45] Date of Patent: May 11, 1993

[54] TELEPHONE INSTRUMENT AND DISTRIBUTION SYSTEM

[76] Inventor: Ole K. Nilssen, Caesar Dr., Barrington, Ill. 60010

[21] Appl. No.: 860,234

[22] Filed: Mar. 27, 1992

Related U.S. Application Data

[63] Continuation of Ser. No. 627,189, Dec. 13, 1990, abandoned, which is a continuation-in-part of Ser. No. 562,897, Aug. 6, 1990, Pat. No. 5,068,890, which is a continuation-in-part of Ser. No. 397,266, Aug. 23, 1989, Pat. No. 5,070,522, which is a continuation-in-part of Ser. No. 136,505, Dec. 23, 1987, Pat. No. 4,866,757, which is a continuation of Ser. No. 921,381, Oct. 22, 1986, abandoned.

[51] Int. Cl.$^5$ .......................................... H04M 1/274
[52] U.S. Cl. ......................................... 379/61; 379/90
[58] Field of Search ........................ 379/61, 60, 59, 58, 379/90, 352, 355, 356, 387, 422, 424, 216, 40, 51

[56] References Cited

U.S. PATENT DOCUMENTS

| | | | |
|---|---|---|---|
| 1,870,547 | 8/1932 | Wise | 379/356 |
| 3,322,905 | 5/1967 | Klumb et al. | 379/356 |
| 5,068,890 | 11/1991 | Nilssen | 379/90 |

Primary Examiner—Stafford D. Schreyer

[57] ABSTRACT

In a combined telephone and electric power distribution system, both telephone signals and electric power are distributed by way of a common distribution system wherein signal conducting means (such as optical fibers) and electric power conducting means are routed alongside each other to/from various utilization points, such as to/from a computer, a special lighting fixture, a power receptacle and/or a special telephone instrument; which special telephone instrument has feature whereby the mere lifting of the receiver causes either a pre-programmed prefix or a pre-programmed telephone number to be dialed automatically. At some of these utilization points, telephone signal receptacles are provided alongside electric power receptacles. At other points, the signal conducting means is terminated in a radio transceiver and wireless signal radiation/receiving means. In a typical situation, such a transceiver has its antenna mounted at or near a ceiling lighting fixture; which radio antenna interacts with some other transceiver combined with a telephone and/or other information-handling apparatus located nearby. In addition to being used for transmitting telephone and/or other information signals, the signal conducting means is used for controlling the flow and/or usage of electric power, such as control of light from individual lighting fixtures, for distributed protection against electrical circuit overload and/or fire hazards. Also included is a provision for supplying uninterruptible power to selected utilization points.

17 Claims, 6 Drawing Sheets

Fig. 4
(see also SHT 3)

Fig. 4
(see also SHT 2)

TELEPHONE INSTRUMENT AND DISTRIBUTION SYSTEM

RELATED APPLICATIONS

This application is a continuation of Ser. No. 07/627,189, filed Dec. 13, 1990, now abandoned, which is a continuation-in-part of Ser. No. 07/562,897 filed Aug. 6, 1990, U.S. Pat. No. 5,068,890; which is a continuation-in-part of Ser. No. 07/397,266 filed Aug. 23, 1989 U.S. Pat. No. 5,070,522; which is a continuation-in-part of application Ser. No. 07/136,505 filed Dec. 23, 1987, now U.S. Pat. No. 4,866,757 issued Sep. 12, 1989; which is a continuation of application Ser. No. 06/921,381 filed Oct. 22, 1986, now abandoned.

BACKGROUND OF THE INVENTION

1. Field of Invention

The present invention relates to a telephone instrument as well as to a system for distributing telephone and other information-carrying signals along with electric power in a common distribution system.

2. Elements of Prior Art

Presently, telephone and other information-carrying signals are distributed by way of a network of telephone wires to various points of signal utilization, such as telephone instruments, fax machines, computer terminals, etc. Electric power is usually distributed by way of a separate network of steel-encased electric conductors to various points of utilization or control, such as wall switches, electric power receptacles, computer terminals, copying machines, lighting fixtures, etc.

Mainly for safety reasons, the two distribution networks are installed well apart from each other and treated as two entirely separate distribution systems. In fact, in view of the National Electrical Code and the requirements of Underwriters Laboratories Inc. (U.L.), it would simply not be permissible to combine in a common cable bunch conductors carrying ordinary 120 Volt/60 Hz power line voltage with telephone wires intended for connection with ordinary telephone instruments.

SUMMARY OF THE INVENTION

Objects of the Invention

An object of the present invention is an improved telephone instrument.

Another object is that of providing for an improved power and/or signal distribution system.

These as well as other objects, features and advantages of the present invention will become apparent from the following description and claims.

BRIEF DESCRIPTION

In a building's system for distributing telephone and other information-carrying signals to various signal utilization means, as well as electric power to various electric power utilization means, such telephone and other information-carrying signals are distributed along with electric power in a common distribution system wherein a signal conduction means (such as ordinary telephone wires, coaxial cable and/or optical fibers) and electric power conduction means are routed alongside each other to/from various end points at which electric power is being utilized, such as to/from electric lighting fixtures, wall switches, power receptacles, etc. At some of these end points, telephone and/or other information signal receptacles are provided alongside electric power receptacles. At others of these end points, the signal conduction means is connected with a radio transceiver and/or wireless signal radiating/receiving means, such as a small two-way radio antenna mounted at or near a ceiling lighting fixture; which radio antenna would interact in two-way manner with a two-way antenna and/or transceiver means combined with a telephone and/or some other information-handling instrument located nearby.

In addition to being used for transmitting telephone and/or other information-carrying signals, the signal conduction means is used for controlling the flow and/or usage of electric power, such as to control the output of light from each individual lighting fixtures, to provide for distributed protection against electrical circuit overload and/or for prevention of fire initiation hazards, such as is presently attained by routing electric power conductors within steel conduits or armor.

One of the telephone instruments connected with the common distribution system has a feature whereby the mere lifting of the receiver causes either a pre-programmed telephone number (or prefix) to be automatically dialed, but only after a brief delay; which brief delay provides for an opportunity to initiate dialing of some other telephone number before the dialing of the pre-programmed telephone number is actually executed.

In its ultimately preferred embodiment, the combination signal and power distribution system incorporates a special PBX (i.e., Private Branch Exchange) system so adapted as to make a given wireless telephone instrument operative automatically to access, and/or to be accessed from, the signal distribution part of the system by way of a small two-way antenna projecting into a room (as from one of the ceiling lighting fixtures) within which the given wireless telephone instrument is located. Thus, a person carrying this wireless telephone instrument will be able, automatically, to place and/or receive telephone calls wherever he might happen to be within a building (or within a system of buildings) wherein each room has a wireless connection or access point (such as via a small antenna on a ceiling lighting fixture) to the signal distribution part of the combined signal and power distribution system.

In its more immediately preferred embodiment, the present invention may be compactly described as follows.

In a building, such as an office building, a power and signal distribution system comprising:

(a) a central location whereat: (i) at a signal terminal means, wireless and/or hard-wire connections are made with some external communications facility, such as a local telephone company; (ii) at a main power terminal means, connection is made with and unconditioned electric power is received from the local electric utility company; and (iii) at an auxiliary power terminal means, connection is made with and conditioned electric power is received from an auxiliary source of electric power, which auxiliary source of electric power may advantageously include a storage battery means;

(b) main power conduction means, such as a set of relatively heavy-gauge electric conductors, connected with the main power terminal means; the main power conduction means being routed, at least in part, along a path to a set of main power utilization points within or near the building;

(c) auxiliary power conduction means, such as a set of relatively light-gauge electric conductors, connected with the auxiliary power terminal means; the auxiliary power conduction means being routed, at least in part, alongside the main power conduction means to a set of auxiliary power utilization points within or near the building;

(d) signal conduction means, such as an optical fibre means, connected with the signal terminal means; the signal conduction means being routed alongside the main power conduction means and/or alongside the auxiliary power conduction means to a set of signal utilization points within or near the building;

(e) a main power utilization means, such as an electric lighting fixture, connected with the main power conduction means at a first of said main utilization points and operative to be powered by unconditioned power provided therefrom;

(f) an auxiliary power utilization means, such as a telephone instrument having a feature whereby the mere lifting of its receiver causes the automatic dialing of a pre-programmed telephone number, connected with the auxiliary power conduction means at a first of said auxiliary utilization points and operative to be powered by conditioned power received therefrom;

(g) a first signal utilization means, such as a computer terminal and/or a telephone instrument, connected with the signal conduction means at a first of said signal utilization points and operative thereby to communicate with said external communications facility; and (h) a second signal utilization means, such as a first wireless transceiver means, connected with the signal conduction means at a second of said signal utilization points and operative thereby to communicate with said external communications facility as well as with a second wireless transceiver means located in the vicinity of the first wireless transceiver means.

DESCRIPTION OF INITIAL EMBODIMENT

Details of Construction of Initial Embodiment

Figure 1:
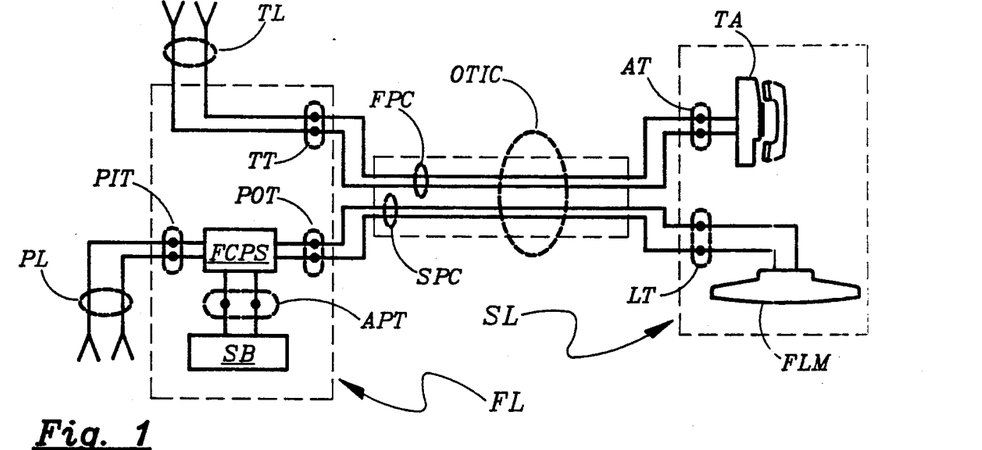
FIG. 1 provides an overall schematic view of a simple initial embodiment of the present invention.

FIG. 1 illustrates the overall arrangement of an initial simple embodiment of the present invention.

In FIG. 1, a telephone line TL and a power line PL both come into a first location FL and connect with a pair of telephone terminals TT and a pair of power input terminals PIT, respectively.

A frequency-converting power supply FCPS is connected with power input terminals PIT, and provides its output at power output terminals POT. A storage battery SB is connected with frequency-converting power supply FCPS by way of a pair of auxiliary power terminals APT.

At a second location SL, a telephone apparatus has a pair of apparatus terminals AT; and a fluorescent lighting means FLM has a pair of lighting terminals LT.

An ordinary telephone installation cable OTIC has a first pair of conductors FPC and a second pair of conductors SPC. The first pair of conductors is connected between telephone terminals TT and apparatus terminals AT; and the second pair of conductors is connected between power output terminals POT and lighting terminals LT.

Figure 2:
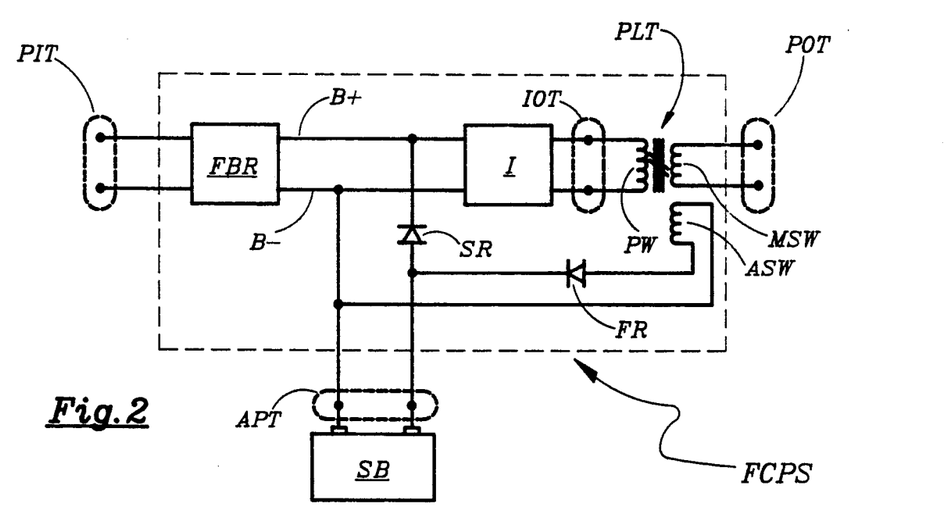
FIG. 2 provides details in respect to the frequency-converting power supply used in the embodiment of FIG. 1.

FIG. 2 provides details of frequency-converting power supply FCPS and its relationship with storage battery SB.

In FIG. 2, a full bridge rectifier FBR is connected with power input terminals PIT and provides its rectified output voltage between a B+ bus and a B− bus. An inverter I is connected with the B+ bus and the B− bus, and provides an AC voltage at inverter output terminals IOT. A power-limiting transformer PLT has a primary winding PW connected across inverter output terminals IOT, a main secondary winding MSW connected with power output terminals POT, and an auxiliary secondary winding ASW connected between the B− bus and the anode of a first rectifier FR, whose cathode is connected with the anode of a second rectifier SR. The cathode of second rectifier SR is connected with the B+ bus.

Auxiliary power terminals APT are connected with the negative and positive terminals of storage battery SB in such manner that the negative terminal connects with the B− bus and the positive terminal connects with the anode of second rectifier SR.

Figure 3:
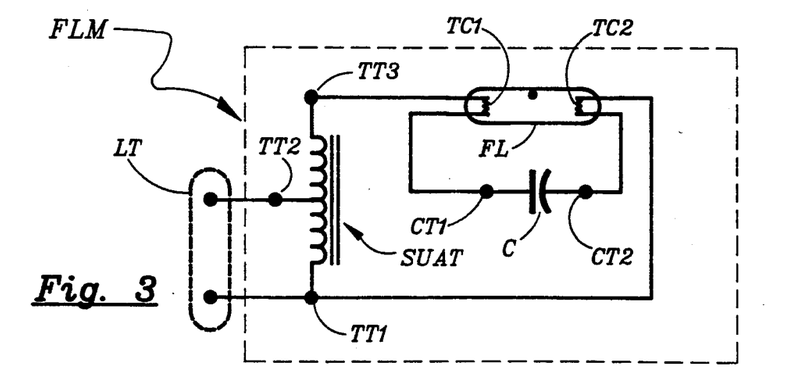
FIG. 3 provides details in respect to the fluorescent lighting means used in the embodiment of FIG. 1.

FIG. 3 provides details of fluorescent lighting means FLM.

In FIG. 3, a step-up auto-transformer SUAT has three transformer terminals TT1, TT2 and TT3. Transformer terminals TT1 and TT2 are connected with lighting terminals LT. Transformer terminal TT3 is connected with a first capacitor terminal CT1 of a capacitor C by way of a first thermionic cathode TC1 of a fluorescent lamp FL. A second capacitor terminal CT2 of capacitor C is connected with transformer terminal TT1 by way of a second thermionic cathode TC2 of fluorescent lamp FL.

Details of Operation of Initial Embodiment

With reference to FIGS. 1-3, the operation of the simple initial embodiment of the invention may be explained as follows.

With frequency-converting power supply FCPS connected with an ordinary 120 Volt/60 Hz power line, a 30 kHz squarewave voltage is provided at inverter output terminals IOT.

The output provided at power output terminals POT is also a 30 kHz voltage. However, due to internal magnetic leakage between primary and secondary windings in power-limiting transformer PLT, the maximum amount of current available from the POT terminals is manifestly and non-dissipatively limited. In particular, the output from the POT terminals is inductively limited in such manner as to meet the specifications in the National Electrical Code for Class-2 electrical circuits.

The output from the POT terminals is connected with a pair of conductors (SPC) in the more-or-less ordinary telephone installation cable OTIC. The telephone line is also connected with a pair of conductors (FPC) in cable OTIC. Thus, both Class-2 electric power as well as ordinary telephone signals are transmitted between the first location (FL) and the second location (SL) by way of an ordinary telephone installation cable (OTIC).

The first location would typically be some central location within a building; and the second location would typically be a telephone booth located some distance away from this building. However, the two locations might also both be located within a single building.

As long as the frequency-converting power supply (FCPS) is being powered by power line voltage from the power line (PL), the storage battery (SB) is being charged from the auxiliary secondary winding (ASW) on the power-limiting transformer (PLT). In the event of power failure, the inverter (I) will be powered from the storage battery; the voltage on which has a magnitude about half that existing between the B+ bus and the B− bus whenever power line voltage is present. Whenever the inverter is being powered by the storage battery, the magnitude of the voltage provided by the ASW winding is too low to cause battery charging.

The 30 Volt/30 kHz voltage provided by the FCPS power supply is transmitted to the fluorescent lighting means (FLM) in the second location (SL), thereby to provide illumination as might be useful in connection with using the telephone apparatus (TA).

In the fluorescent lighting means (FLM), the step-up autotransformer (SUAT) receives the 30 Volt/30 kHz inductively current-limited voltage from the POT terminals of the FCPS power supply and transforms it to a 100 Volt/30 kHz inductively current-limited voltage. In combination with capacitor C, this 100 Volt/30 kHz inductively current-limited voltage is appropriate for starting and powering the fluorescent lamp (FL) by way of series-resonant action.

Additional Comments Regarding Initial Embodiment (a) For further details in respect to frequency-converting power supplies and series-resonant ballasting circuits for fluorescent lamps, reference is made to U.S. Pat. No. Re. 31,758 to Nilssen and U.S. Pat. No. 3,710,177 to Ward.

(b) The series-resonant ballasting circuit described by Ward is especially suitable for powering a fluorescent lamp over a wide range of different driving voltage magnitudes. In particular, reducing the driving voltage magnitude by a factor of two, reduces the lamp light output by less than a factor of two.

(c) If it should happen that the distance between the first location (FL) and the second location (SL) is more than about 100 feet, it is advantageous to reduce the frequency of the driving voltage provided by the frequency-converting power supply (FCPS). In particular, for very large distances, it is anticipated that frequencies as low as 1 kHz may be used.

(d) The maximum amount of power available from the power output terminals (POT) of the frequency-converting power supply (FCPS) is 100 Watt; which is the maximum amount permissible for Class-2 electrical circuits in accordance with the National Electrical Code.

(e) It is expected that, in addition to use in connection with telephone booths and the like, the combined telephone and distribution system of FIG. 1 will find use in homes, offices, and the like; and that both telephone signals and Class-2 electric power will be available by way of ordinary telephone-type receptacle means. In particular, it is anticipated that the output from the frequency-converting power supply (FCPS) be provided at the point in a building from which the telephone signals are distributed, thereby to provide for both telephone signals as well as Class-2 electric power to be distributed by way of a common ordinary multi-conductor telephone cable to multiple locations within the building: typically to the locations where telephone instruments are located.

(f) The National Electrical Code is established by National Fire Protection Association, Batterymarch Park, Quincy, Mass. 02269. Its presently most up-to-date version is provided in a book entitled NATIONAL ELECTRICAL CODE 1984; which book is published by National Fire Protection Association. By reference, this book in general, and Article 725 thereof in particular, is herewith made part of this patent specification.

(g) Article 725 of the National Electrical Code deals with power-limited circuits; which power-limited circuits are designated Class-1, Class-2, and Class-3 circuits.

Class-2 circuits refer to electrical circuits wherein: i) the maximum voltage available from or within the circuit is low enough in magnitude to be substantially free from electrical shock hazard to a person coming in direct electrical contact with terminals and/or other elements of the circuit, and ii) the maximum power available from or within the circuit is low enough to be substantially free of fire initiation hazard in case of an electrical malfunction, such as a short circuit.

Class-3 circuits refer to electrical circuits wherein: i) the maximum magnitude of any voltage available from or within the circuit is not higher than 150 Volt, and ii) the maximum power available from or within the circuit is low enough to be substantially free of fire initiation hazard in case of an electrical malfunction, such as a short circuit.

Under most conditions, the continuously available Volt-Ampere product from a Class-2 or Class-3 electrical circuit must be limited to a maximum of 100 Volt-Ampere; which means that the power available is correspondingy limited to a maximum of 100 Watt.

(h) The output from the frequency-converting power supply (FCPS) of FIGS. 1 and 2 is limited in accordance with the specifications in the NATIONAL ELECTRICAL CODE 1984 for Class-2 circuits; which means that it also complies with the specifications for Class-3 electrical circuits. Thus, under most conditions, the Volt-Ampere product available from the POT terminals of the FCPS power supply on a continuous basis may be as high as, but will not exceed, 100 Volt-Ampere.

As indicated in FIG. 2, limitation of Volt-Ampere product output is attained by providing for manifest magnitude-limitation on available output current; which manifest magnitude-limitation is attained by providing for less than 100% coupling between primary winding PW and main secondary winding MSW on power-limiting transformer PLT. Thus, current magnitude-limitation is attained by non-resistive or non-dissipative means.

(i) It is anticipated that glass or optical fiber means may be used instead of ordinary electrical conductors for providing telephone signal transmission between the first location (FL) and the second location (SL); in which case the OTIC cable of FIG. 1 would consist of optical fiber means in combination with electrical conductor means.

Thus, alternatively, the pair of lines labeled FPC in FIG. 1 represent an optical fiber means.

(j) The amount of power provided to the fluorescent lighting means (FLM) of FIGS. 1 and 3, is about 40 Watt.

Thus, the amount of power transmitted by way of the electric power transmission path (namely the SPC conductors of FIG. 1) is on the order of many Watt. On the other hand, the amount of power transmitted by way of the telephone transmission path (namely the FPC conductors of FIG. 1) is only on the order of a small fraction of one Watt.

(k) To minimize power losses and/or to permit longer transmission distances, it is anticipated that the SPC conductors of the OTIC cable be made of two or more parallel-connected pairs of the multiple individual conductors present in an ordinary telephone installation cable, or—alternatively—be made of heavier gauge conductors.

(l) In addition to, or instead of, the fluorescent lighting means (FLM) in FIG. 1, other electric power utilization means may be employed.

Similarly, in addition to, or instead of, the telephone apparatus (TA) of FIG. 1, other telephone signal utilization means may be employed.

For instance, the second location (SL) may harbor a computer terminal connected with the telephone signal transmission means (namely the FPC condustors) as well as with the electric power transmission means (namely the SPC conductors). That way, information transfer may take place by way of the telephone signal transmission means, and Class-2 electrical power transmission for operation of the computer terminal may be provided by way of the electric power transmission means.

(m) A telephone utility signal line is herewith defined as that set of electrical conductors, fiber optic means, or radio link means, used for transmitting telephone and-/or similar signals between the location of a telephone company's facility and the location of a telephone customer.

(n) The amount of electric power available from a telephone utility signal line is on the order of milliwatts.

(o) The amount of electric power available from an ordinary electric power line in a home or office, as by way of an ordinary electric wall receptacle means, is on the order of kilo-watts.

(p) There is no inherent reason for the magnitude of the power transmitted along-side the telephone utility signal line be limited to 100 Watt. Clearly, by providing for other means for fire-initiation protection, larger amounts of power may safely be provided.

(q) It is emphasized that the telephone utility signal line may be used for communications relative to the power being provided therealongside. Thus, for instance, a signal may be generated indicating the magnitude of the current being drawn by the load (or each load); and this signal may be transmitted to the source of power and used to compare the magnitude of the current drawn by the load versus the magnitude of the current being prodided from the source. Then, if there be any substantive difference therebetween, potential fire hazard may be indicated (as from an unauthorized load, such as a partial short circuit); and protective measures—such as circuit interruption—could be implemented.

(r) A basic concept herein disclosed in that of transmitting conditioned electric power alongside a telephone utility signal line, thereby to provide for a substantive amount of electric power at or near the point of utilization of the telephone signal. A corollary concept is that of transmitting information alongside a power transmission line; in which case information can be transmitted back relative to the utilization of the electric power. In either case, however, because of the immense ratio in magnitude difference between the power level associated with the electric power transmitted and the power level associated with the information signal transmitted, a high degree of separation is needed between the signal transmitting means and the power transmitting means. Consequently, due to the immense differences in transmission frequencies, to attain a high degree of electro-magnetic separation, a fiber optic line would be a particularly suitable signal communication means to be used alongside a power transmitting line.

DESCRIPTION OF THE PREFERRED SYSTEM

Details of Construction of the Preferred System

Figure 4:
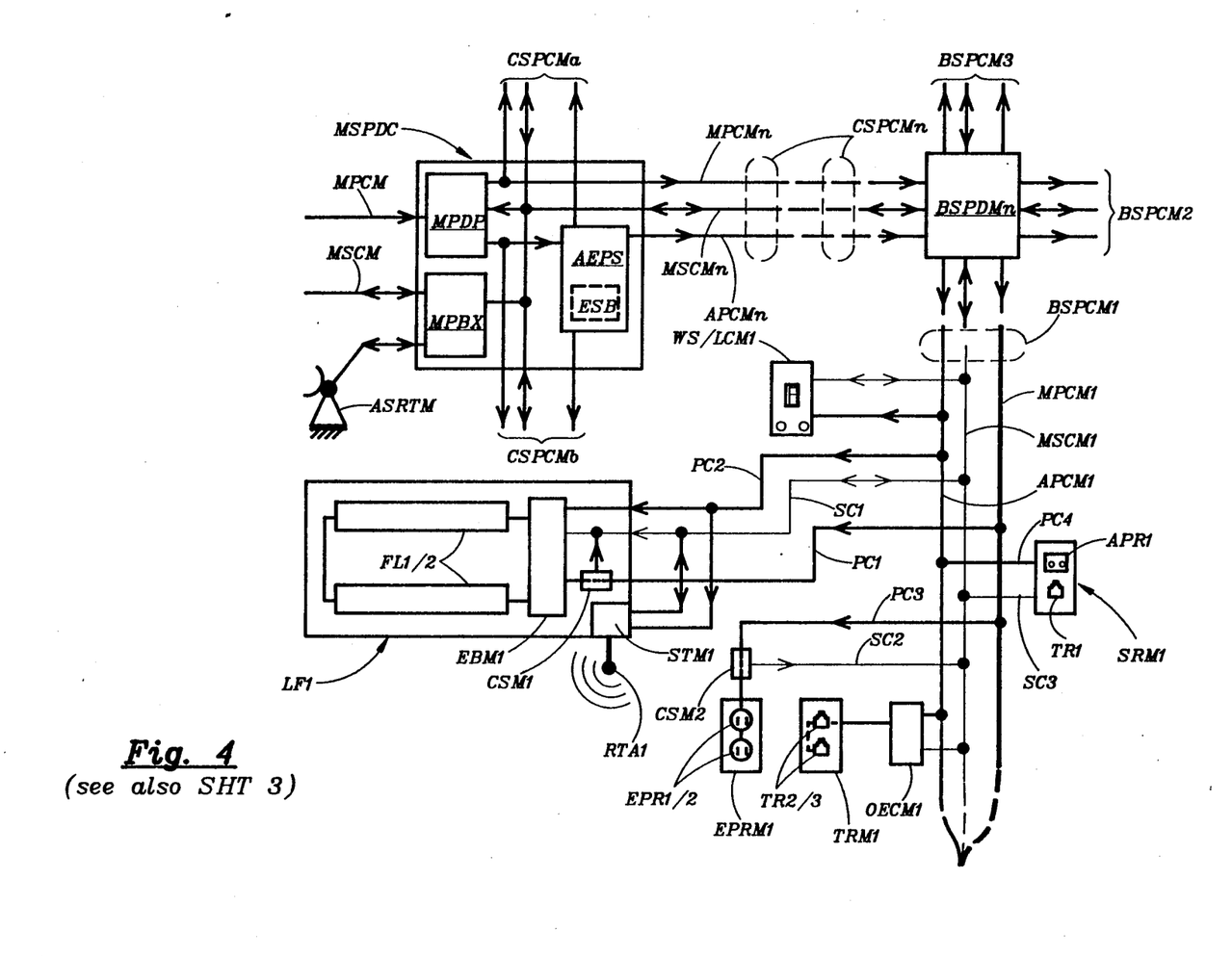
FIG. 4 provides an overall schematic diagram of the systems aspect of the preferred embodiment of the present invention.

FIG. 4 schematically illustrates the systems aspect of the preferred embodiment of the present invention. In FIG. 4, power from a local electric utility company is provided via main power conducting means MPCM (which may consist of two or more conductors transmitting single or multi-phase power) to main power distribution panel MPDP of main signal and power distribution center MSPDC. Main signal conducting means MSCM provides for signal transmission between a main private branch exchange MPBX and the local telephone utility company. Also connected with main private branch exchange MPBX is an external auxiliary signal receiving and transmitting means ASRTM; which might be a so-called microwave link.

Connected with main power distribution panel MPDP is an auxiliary electric power source AEPS; which includes an electric storage battery ESB.

Several sets of combined signal/power conducting means, CSPCMa, CSPCMb, and CSPCMn, are connected with main signal and power distribution center MSPDC. Each of these sets has a main power conducting means (ex: MPCMn) connected with main power distribution panel MPDP, a main signal conducting means (ex: SCMn) connected with main private branch exchange MPBX, and an auxiliary power conducting means (ex: APCMn) connected with auxiliary electric power source AEPS.

Combined signal/power conducting means CSPCMn connects with a branch signal/power distribution means BSPDMn; which, in turn, is connected with plural sets of branch signal/power conducting means BSPCM1, BSPCM2 and BSPCM3. Branch signal/power conducting means BSPCM1 comprises main power conducting means MPCM1, main signal conducting means MSCM1 and auxiliary power conducting means APCM1. Branch signal/power conducting means BSPCM1 then connects with various signal and-/or power utilization and/or control means, as follows.

A wall switch and light control means WS/LCM1 is connected with main signal conducting means MSCM1 and auxiliary power conducting means APCM1.

A lighting fixture LF1 has two fluorescent lamps FL1/2 which are series-connected across the output of an electronic ballasting means EBM1; which is connected with: (i) main power conducting means MPCM1 via power conductor PC1, which runs through current sensing means CSM1; (ii) main signal conducting means MSCM1 via signal conductor SC1, which is connected with current sensing means CSM1; and (iii) auxiliary power conducting means APCM1 via power conductor PC2.

A signal transceiver means STM1, which is incorporated into lighting fixture LF1, is connected with power conductor PC2 and signal conductor SC1. It has a receive/transmit antenna RTA1 projecting out from the body of the lighting fixture.

An electric power receptacle means EPRM1 is connected with main power conducting means MPCM1 via a power conductor PC3; which power conductor PC3 runs through a current sensor means CSM2; which current sensor means, in turn, is connected with main signal conducting means MSCM1 via a signal conductor SC2. Electric power receptacle means EPRM1 has electric power receptacles EPR1/2; each of which is operative to receive and hold an ordinary electric power plug.

A special receptacle means SRM1 is connected with auxiliary power conducting means APCM1 and main signal conducting means MSCM1 via power conductor PC4 and signal conductor SC3, respectively. Special receptacle means SRM1 has an auxiliary power receptacle APR1 and a telephone receptacle T1.

A telephone receptacle means TRM1 is connected with main signal conducting means MSCM1 via an opto-electronic converter means OECM1; which, in turn, is connected with auxiliary power conducting means APCM1. Telephone receptacle means TRM1 has two telephone receptacles TR2/3; each of which is operative to receive and hold an ordinary telephone plug.

A suspended ceiling SC is suspended below a permanent ceiling PC, and branch power/signal conducting means BSPCM1 is located in the space between. Below the suspended ceiling is an office/room OR.

Mounted in the suspended ceiling are lighting fixtures LF2 and LF3, which comprise fluorescent lighting means FLM2 and FLM3 as well as electronic ballasting means EBM2 and EBM3, all respectively. Electronic ballasting means EBM2 and EBM3 are each connected with main power conducting means MPCM1, main signal conducting means MSCM1, and auxiliary power conducting means APCM1 of branch signal/power conducting means BSPCM1.

Also mounted in the suspended ceiling is a signal transceiver means STM2, which has a receive/transmit antenna RTA2 protruding into office/room OR. Signal transceiver means is connected with main signal conducting means MSCM1 as well as auxiliary power conducting means APCM1 of branch signal/power conducting means BSPCM1.

Located somewhere in office/room OR is a cordless telephone CT1 with a receive/transmit antenna RTA3; and positioned into a telephone charger-holder TCH, which is mounted on a wall W1, is a cordless telephone CT2. Telephone charger-holder TCH includes a telephone charging means TCM, which is connected with auxiliary power conducting means APCM1 of branch signal/power conducting means BSPCM1.

An electric power receptacle means EPRM2 is connected with main power conducting means MPCM1 as well as with main signal conducting means MSCM1 of branch signal/power conducting means BSPCM1. A table lamp TL has a power cord PC with a power plug PP plugged into electric power receptacle means EPRM2.

A wall switch and light control means WS/LCM2 is connected with main signal conducting means MSCM1 and auxiliary power conducting means APCM1 of branch signal/power conducting means BSPCM1.

A computer terminal CT has a signal connection cord SCC and a power connection cord PCC having, respectively, a special signal plug SSP and a special power plug SPP. These two plugs are plugged into a special receptacle means SRM2; which, in turn, is connected with main signal conducting means MSCM1 and auxiliary power conducting means APCM1 of branch signal/power conducting means BSPCM1.

A telephone instrument TI is connected via a telephone connect cord TCC with a telephone receptacle of a telephone receptacle means TRM2; which, in turn, is connected with main signal conducting menas MSCM1 and auxiliary power conducting means APCM1 of branch signal/power conducting menas BSPCM1.

Figure 5:
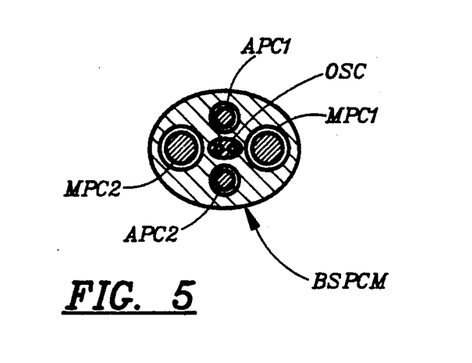
FIG. 5 shows a section of the combined main power, auxiliary power, and signal conduction means.

FIG. 5 shows a cross-section of a branch signal/-power conducting means BSPCM (such as BSPCM1), particularly indicating a pair of main power conductors MPC1 and MPC2, a pair of auxiliary power conductors APC1 and APC2, and an optical signal conductor OSC.

Figure 6:
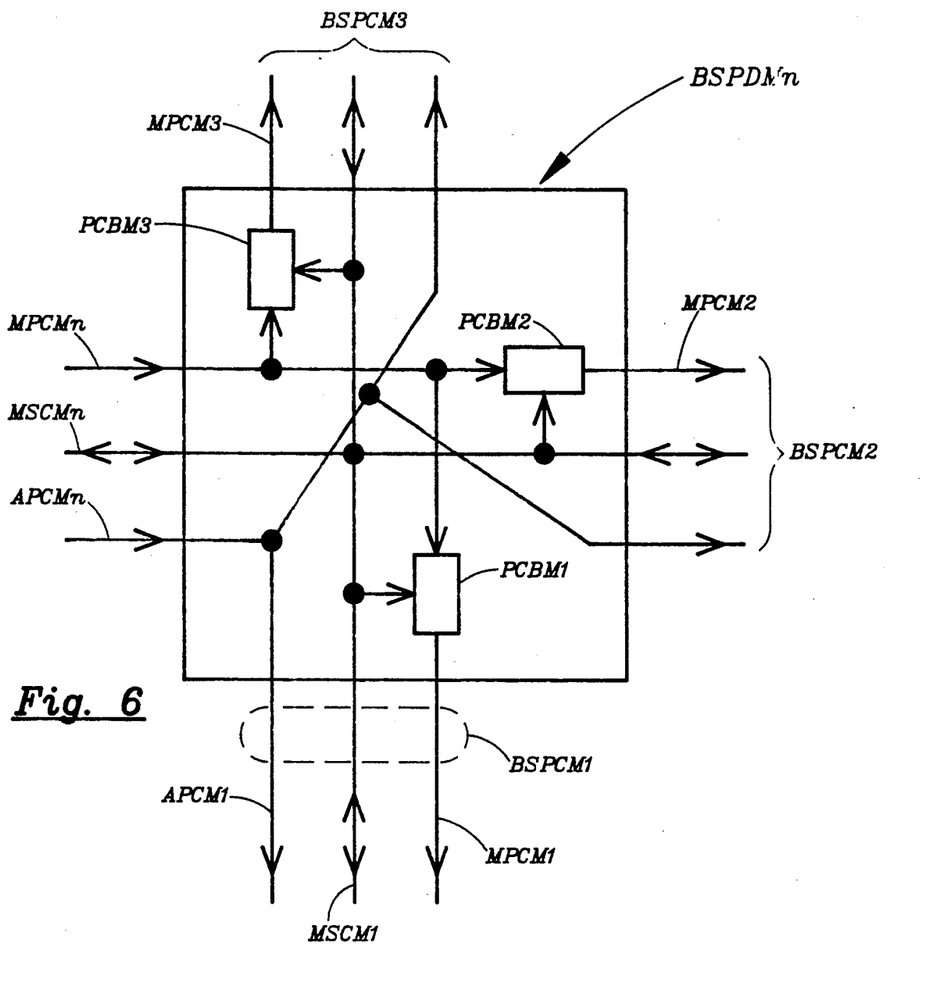
FIG. 6 schematically illustrates details near a branch point of subject combined power and signal distribution system.

FIG. 6 shows key details of branch signal/power distribution means BSPDMn, particularly indicating that main power conductor means MPCMn connects with main power conducting means MPCM1 by way of a programmable circuit breaker means PCBM1; which programmable circuit breaker means is connected with main signal conducting means MSCM1. Otherwise, auxiliary power conducting means APCMn is shown to be directly connected with auxiliary power conducting means APCM1, and main signal conducting means MSCMn is shown to be directly connected with main signal conducting means MSCM1. Main power conducting means MPCM2 and MPCM3 connect with main power conducting means MPCM by way of programmable circuit breaker means PCBM2 and PCBM3, respectively.

Figure 7:
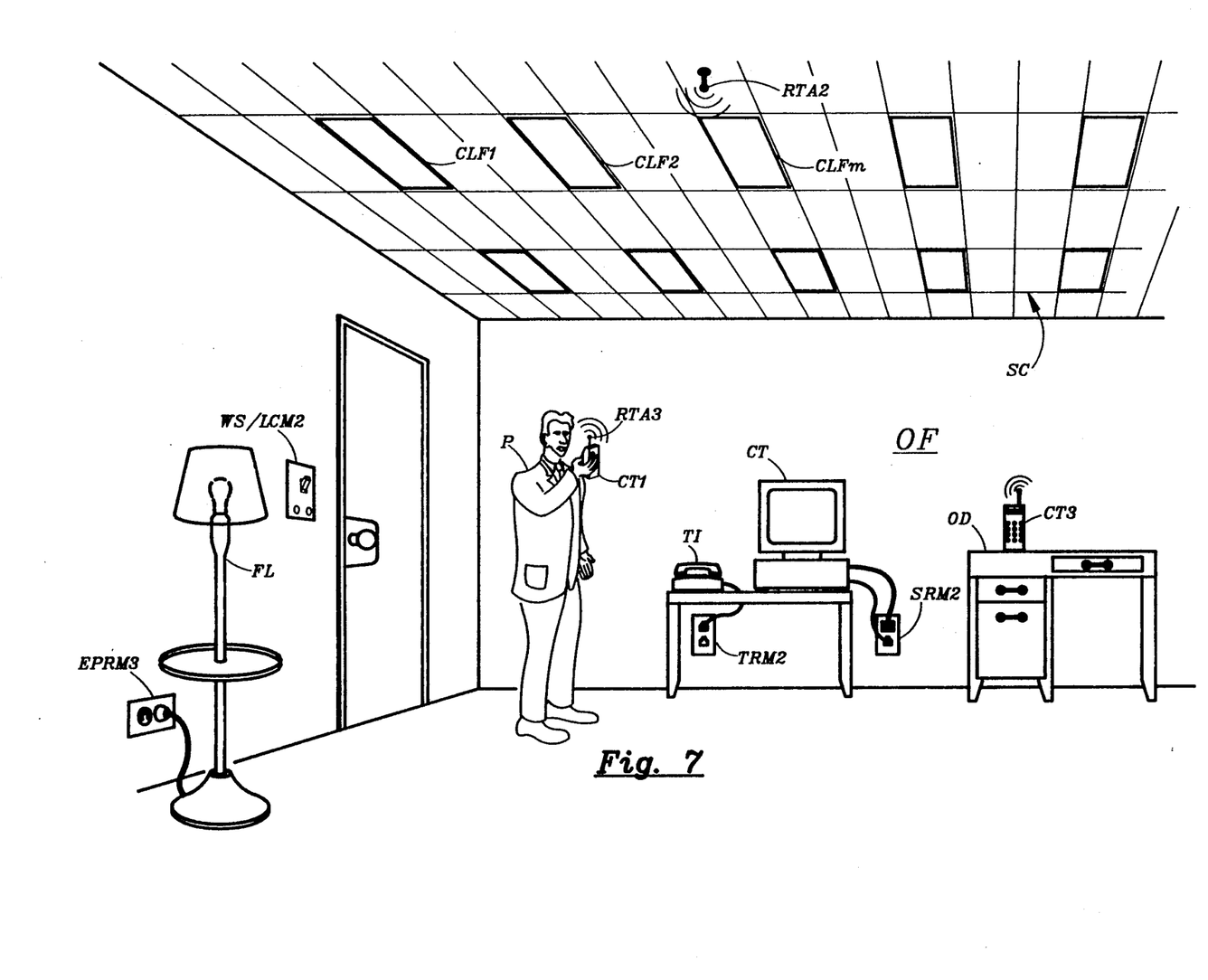
FIG. 7 shows key features of the present invention by way of a perspective view of plural rooms in a building with power and signal distribution system in accordance with the preferred embodiment of the present invention.

FIG. 7, in a perspective view, illustrates how the system of FIG. 4 might appear in an office OF in which a person P is holding cordless telephone CT1 with receive/transmit antenna RTA3; which connects via wireless means with receive/transmit antenna RTA2; which connects with signal transceiver means STM2 (located above suspended ceiling SC, as in FIG. 4) and which protrudes from the ceiling into office OF.

Otherwise, the office has numerous ceiling lighting fixtures CLF1, CLF2 ... CLFm; which are controlled from wall switch and light control means WS/LCM2. Another cordless telephone CT3 is shown standing on an office desk OD; computer terminal CT is shown to connect with special receptacle means SRM; telephone instrument TI is shown connected with telephone receptacle means TRM2; and electric power receptacle means EPRM3 is shown powering a floor lamp FL.

Details of Operation of the Preferred System

In the combined signal and power distribution system of FIG. 4, at the main signal and power distribution center (MSPDC), electric power from the local electric utility is received at main power distribution panel MPDP via main power conducting means MPCM. The main signal conducting means (MSCM) provides for connection between the local telephone company and the main private branch exchange (MPBX); which is also connected with the auxiliary signal receive/transmit means (ASRTM) via which telephone and other signals are interchanged with some remotely located wireless receive/transmit means (not shown).

Within the main signal/power distribution center (MSPDC), the auxiliary electric power source (AEPS), which is connected with and powered from the main power distribution panel (MPDP), provides conditioned electric power to its three separate outputs, one of which is connected with auxiliary power distribution means AEPDMn. This conditioned electric power is similar to the unconditioned electric power received from the local electric utility company, except that it continues to be provided even during periods where delivery of electric power from the local electric utility company is interrupted; during which periods the conditioned electric power is derived from the electric storage battery (ESB) by way of a voltage conditioner means; which storage battery is charged by power derived from the local electric utility company during periods other than those associated with interruption in power delivery therefrom.

From the main signal/power distribution center, main electric power from the main power distribution panel as well as auxiliary electric power from the auxiliary electric power source are distributed to plural branch signal/power distribution means, such as via common signal/power conducting means CSPCMn to branch signal/power distribution means BSPDMn. Also, the various branch signal/power distribution means (such as BSPDMn) are each connected with the main signal/power distribution center (MSPDC) via a main signal conducting means (such as MSCMn).

From each branch signal/power distribution means (ex: BSPDMn), main electric power is distributed to its associated main power conducting means (ex: MPCM1) via a programmable circuit breaker means (ex: PCBM1). This programmable circuit breaker means is operative to interrupt the flow of power in its associated main power conducting means (ex: MPCM1) in response to information received via main signal conducting means MSCM; which carries the same information signals as do the other main signal conducting means (ex: MSCM1).

More particularly, using PCBM1 as an example, the programmable circuit breaker means operates as follows: (i) it senses the magnitude of the current flowing through it (i.e., the current delivered to its associated main power conducting means MPCM1) and derives an internal electrical measure for that magnitude; (ii) it receives information via the main signal conducting means (MSCM1) with respect to the magnitude of the current drawn by each of the loads connected with its associated main power conducting means (MPCM1); (iii) it compares its own measure of the current flowing through it with the sum of the magnitudes of the currents drawn by the various loads connected to its associated main power conducting means (MPCM1); and (iv) if the result of this comparison shows that more current is flowing through circuit breaker means PCBM1 than is accounted-for by the various loads powered through it, it acts to interrupt the flow of current to its associated main power conducting means. Thus, if an unauthorized load (such as an accidental short circuit) were to be connected with a given main power conducting means (ex: MPCM1), its associated programmable circuit breaker (PCBM1) would sense it and act to interrupt the supply of current to that given main power conducting means.

In other words, each of the various loads (ex: lighting fixture LF1) properly connected with a given main power conducting means (MPCM1) draws its power via a current sensing means (CSM1); which current sensing means is connected to a nearby main signal conducting means (MSCM1) and, via this signal conducting means, transmits information to the associated programmable circuit breaker means (PCBM1) with respect to the magnitude of the current flowing through it, thereby to provide to the associated programmable circuit breaker means information with respect to the (instantaneous) magnitude of each individual one of the various loads properly connected with the associated main power conducting means.

As a consequence of providing-for the above-indicated auditing and control of the current provided to the various loads served via a given programmable circuit breaker means, there is much reduced need for protecting the main power conducing means by mechanical armor, such as steel conduit. This is so for the reason that the above-described system prevents any substantial amount of power from being dissipated by way of an unauthorized load. Thus, an accidental short circuit of a main power conducting means is effectively prevented from constituting a fire initiation hazard.

In effect, except to the degree that power is being extracted via a proper current sensing means (ex: CSM1), each main power conducting means may be considered as a so-called Class-3 electrical circuit (which, according to the definitions of the National Electric Code, means that the maximum power available from it on a continuous basis must not exceed 100 Watt) and therefore substantially safe from fire initiation hazard.

Clearly, to meet the specifications of Class-3 electrical circuits, the sensitivity of each programmable circuit breaker means should be such as to act to interrupt the flow of current at some point before unauthorized power drain exceeds 100 Watt.

In subject combined signal and electric power distribution system, power is delivered to plural lighting fixtures (ex: LF1) mounted in a suspended ceiling (SC). Each of these lighting fixtures is connected both with its nearby main power conducting means (MPCM1) as well as with its nearby main signal conducting means (MSCM1); however, each of at least some of these lighting fixtures is also connected with its nearby auxiliary power conducting means. With respect to each of these latter lighting fixtures, the associated electronic ballasting means (ex: EBM1 in lighting fixture LF1) is so designed and constructed as to be operative to be powered from its associated auxiliary power conducting means (APCM1) during periods when the supply of power from its associated main power conducting means (MPCM1) is interrupted, thereby to continue to provide light output even during periods of main power failure.

Also, in at least some of the lighting fixtures, the ballasting means is so designed and constructed as to be able to receive instructions in the form of signals from from its associated main signal conducting means and to adjust the level of its light output in accordance with those instructions. More particularly, via a central switch and control means (ex: WS/LCM1), at least some of the lighting fixtures may be switched ON and OFF, as well as having its light output level adjusted, by way of signals transmitted from this central switch and control means to these lighting fixtures by way of the main signal conducting means.

Otherwise, power is delivered on a continuous basis from the auxiliary electric power source (AEPS), via the auxiliary power conducting means (such as via APCM1), to various loads for which power interruption would be particularly disadvantageous, such as computers (ex: CT) and telephone instruments (ex: TI). Although not shown (for the purpose avoiding unnecessary complexities in the drawings), the delivery of electric power via the various auxiliary power conducting means is also audited and controlled in the same manner as is the delivery of power via the various main power distributing means. Otherwise, for purposes of safety from fire initiation, it would be necessary to distribute the auxiliay electric power in mechanically armored conduits.

In attaining the above-identified functions, the main signal conducting means is required to handle numerous different signals at the same time: transmitting such signals back and/or forth between any two or more of numerous spaced-apart locations along the signal conducting means.

Several different techniques permit the substantially simultaneous transmission of numerous different signals along a single signal conducting means (such as an optical fibre), thereby effectively making this single signal conducting means provide-for a plurality of separate and independent communication channels. However, in instant situation, it is necessary not only to provide for such a plurality of separate communication channels, but it is also necessary to make any number of these channels accessible at any one or more locations along the signal conducting means.

In the preferred embodiment, the above-indicated features are attained via a time-multiplexing technique combined with using an optical fibre as the signal conducting means; the operation of which combination is explained via simplified example, as follows.

In an optical fibre, a capacity of 100 separate broad-band signal channels are provided-for by dividing time into segments each having a duration of ten milli-seconds, and then by dividing each of these ten-milli-second-long time-segments into 100 time-slots, each having a duration of 100 micro-seconds. Thus, each individual communication channel is represented by a particular one of these hundred-micro-second-long time-slots, repeated once during each ten-milli-second-long time-segment; which is to say that each individual channel may be identified by a number (from 1 to 100) indicating what particular hundred-micro-second-long time-slot it constitutes within each ten-milli-second-long time-segment.

Still more particularly, each given one of the different current sensing means (ex: CSM1) includes electronic information processing means operative to convert the sensed magnitude of its through-flowing current into a commensurately digitally coded signal, and then to deliver this coded signal to the nearby main signal conducting means every ten milli-seconds during its designated hundred-micro-second-long time-slot. Thus, the information regarding the magnitude of the through-flowing current is updated once each ten milli-seconds; which is adequately frequent for most ordinary purposes. Each time after being delivered to the main signal conducting means, this coded signal courses along this main signal conducting means and, within a matter of less than a few micro-seconds after initial delivery, reaches the programmable circuit breaker means (PCBM1) associated with the particular main power conducting means (MPCM1) feeding current through the given one of the different current sensor means (i.e., CSM1).

This programmable circuit breaker means (PCBM1) has been pre-programmed to selectively receive whatever signal is provided during the hundred-micro-second-long time-slot designated to particular given one of the different current sensor means (CSM1), as well as from each and every one of any other current sensor means (ex: CSM2) subject to current delivered from the particular main power conducting means (MPCM1) associated with this particular programmable circuit breaker means (PCBM1). As additional loads with additional current sensor means are added, the programming of the associated programmable circuit breaker means is correspondingly modified.

Within a given programmable circuit breaker means, the information received from the different associated current sensor means is processed such as to result in a single (digital) signal representing the sum of all the load currents flowing through all the different associated current sensor means; which sum signal is then compared with an internal (digital) signal representing the magnitude of the total current delivered through that given programmable circuit breaker means; which internal signal is derived from the output of a current sensor means built into the given programmable circuit breaker means and operative to sense the magnitude of the total current delivered therethrough. Then, if the comparison shows that the magnitude of the delivered current is larger than that of the sum of the individual load currents, the circuit breaker acts to interrupt the delivery of current.

With respect to the various wall switches and light control means (ex: WS/LCM1), the various remotely controllable electronic ballast means (ex: EBM1), the various telephone receptacle means (ex: TRM1), the various special receptacle means (ex: SRM1), the various signal transceiver means (ex: STM1), etc., each has one or more designated unique time-slots; and each can communicate via the main signal conducting means (ex: MSCM1) (by way of its associated unique time-slot) and thereby with each other as well as with the main private branch exchange (MPBX) as well as with the local telephone company and/or with the auxiliary signal receiving and transmitting means (ASRTM).

An ordinary telephone conversation can readily be carried-on over each one of the hundred-micro-second-long time-slots; which is to say: over each one of the 100 communication channels provided by the above-described time-multiplexing feature. To provide for this type of time-multiplexed telephone conversation, each telephone instrument (ex: TI or CT1) includes the following key elements and features.

(1) Each telephone instrument has a means for converting a continuous audio (or voice) signal into a stream of hundred-micro-second-long bursts of digitized information; which bursts are updated and repeated once each ten milli-seconds. In the preferred embodiment, this conversion is accomplished by: (i) converting the analog audio signal (via an analog-to-digital converter means) into a stream of digitized information with a clock rate of 100 kHz; MHz; (ii) dividing or segregating this stream of digitized information into ten-milli-second-long segments; (iii) directing each such segment into a stepping register clocked at 100 kHz, thereby absorbing that segment into this stepping register; (iv) increasing the clock rate of that stepping register to 10 MHz (after the complete ten-milli-second-long segment has been absorbed), thereby time-compressing each one of these ten-milli-second-long segments to a hundred-micro-second-long burst of "concentrated" digitized audio or voice signal; and (v) once each ten milli-seconds, providing such a burst (at some output terminal means) during a selected one of the 100 separate hundred-micro-second-long time-slots.

(2) Likewise, each telephone instrument has a digital-to-analog conversion means for converting the above-indicated stream of hundred-micro-second-long bursts of digitized information into a continuous voice signal; which process is accomplished in a manner that is completely analogous (in an obverse manner) to the above-described analog-to-digital conversion process.

(3) Also, each (of at least some) of the telephone instruments has a voice-scrambling means operative to make the digitized voice information non-decipherable except by way of a deciphering means having the appropriate algorithm for de-scrambling.

(4) Moreover, each telephone instrument has a means to connect with the main signal conducting means (ex: via MSCM1) (either via a telephone plug or via a wireless tranceiver means), and to enter its digitized voice information (in the form of the indicated repeated hundred-micro-second-long bursts) into any chosen one of the 100 separate communication channels (i.e., into any one of the 100 hundred-micro-second-long time-slots). Likewise, each telephone instrument has an obverse-analogous means to receive digitized voice information from any one of the 100 separate communication channels.

(5) Each one individual telephone instrument has a designated communication channel (i.e., a designated hundred-micro-second-long time-slot) via which it may be reached. When so initially reached by a signal from another telephone instrument, this signal conveys information with respect to the designated communication channel of the other telephone instrument (i.e., the equivalent of its extension number); which therefore permits the one telephone instrument to respond by automatically causing its digitized voice output to be entered into the main signal conducting means at the particular time-slot corresponding to that other telephone instrument's designated communication channel.

It is important to recognize that the length of the signal conducting means represents a factor that may affect the quality of this signal communication function. Thus, without making special provisions, the relatively simple above-described communication system and function will only operate properly as long as the length of the main signal conducting means is very short relative to the length of the wave-train associated with the hundred-micro-second-long burts of digitized information; which, with the speed of light being equal to 300,000 kilo-meters per second, means that the length of this wave-train is about 100,000 feet; which further means that the total length of the signal conducting means should not exceed about 1000 feet.

More particularly, with the communication signal traveling along its signal conductor means at about 300,000 km/sec, channel-to-channel interference may result when the transmission time between points amounts to a significant fraction of the duration of one of the hundred-micro-second-long time-slots.

On the other hand, by making each time-slot substantially shorter than 100 micro-seconds in duration, substantially more than 100 time-slots may be accommodated within each ten-milli-second-long time-segment; which, in turn, means that the total number of communication channels may be increased substantially. For instance, making each burst of digitized audio information have a duration of only one micro-second (i.e., making each time-slot only one micro-second long) would permit the signal conducting means to carry 10,000 independent communication channels versus only 100. However, except if making provisions of the type described hereinbelow, using one-micro-second-long time-slots would limit the permissible maximum length of the signal conducting means by a factor of 100 as compared with using hundred-micro-second-long time-slots.

Of course, if more than 100 communication channels were to be required, multiple signal distribution means could be provided for.

Otherwise, it is noted that main private branch exchange MPBX provides, by way of the optical fibre means, the master clock signal necessary to synchronize the operation of the various signal-generating and/or signal-utilizing means.

In situations where it is desirable to have substantially more than 100 separate communication channels and/or to operate over distances far in excess of 100 feet, the following alternative embodiment is preferable: in which alternatively preferred embodiment each time-segment is one milli-second long and each time-slot is only one micro-second long; which, in turn, means that a total of 1000 communication channels can be provided for by this alternatively embodiment.

The alternatively preferred obviates the above-indicated potential channel-to-channel interference by: (i) having the signal conducting means (ex: MSCM1) comprise a looped optical fibre wherein one end of a continuous optical fibre (the start point) originates at the MPBX and other end of the same continuous optical fibre (the end point) terminates at the MPBX; (ii) having the end point of this continuous optical fibre connected with its start point by way of electronic digital delay and signal conditioning means (hereinafter referred-to simply as "delay means"); (iii) having fibre-loop contained in the form of two separate optical located adjacent one another within the main signal conducting means (with the far ends of the two optical fibres optically joined together at the far end of the signal conducting means); (iv) having each one of the various telephone instruments connected at one point in the fibre-loop; (v) having each telephone instrument so connected and arranged that it will enter its signals into the optical fibre in such manner that these signals will travel only in one direction toward the MPBX (which direction is hereinafter defined as "downstream", with the opposite direction being defined as "upstream"), while it will extract signals from the optical fibre as they come from the MPBX and/or from any other points upstream; (vi) having the delay means receive signals from the end point of the fibre-loop and, after a certain time delay, deliver the same signals at a reduced magnitude to the start point; and (viii) having this certain time delay being of such duration as to cause a signal having originated from a given telephone instrument to arrive back to this very same instrument exactly one millisecond later (at a reduced magnitude).

The reason for making the magnitude of the signals entered by the delay means (at the start point of the fibre-loop) substantially lower in magnitude than those signals the delay means receives from the fibre-loop (at its end point) relates to avoidance of potential interference; which potential interference and its avoidance arise as follows: (i) a given telephone instrument will, during each of its designated time-slots, send a freshly updated signal downstream along the optical fibre; (ii) this freshly updated signal will be entered by that given telephone instrument at its particular point of connection with the fibre-loop (i.e., point of entry) at the very time that its previously-entered signal reaches that very point of entry; (iii) by making the (freshly updated) signal then being entered far larger in magnitude than the previously-entered signal just then arriving, this previously-entered signal will in effect be erased (obliterated) by the currently far-larger-in-magnitude signal. Then, as this far-larger-in-magnitude signal passes by other telephone instruments further downstream, or as it reaches the MPBX (i.e., the delay means), the associated downstream points of entry will only detect most-recently-entered (freshly updated) signal.

Additional Comments Regarding Preferred System Embodiments (r) Actually, the total number of useful communication channels in the above-described alternatively preferred embodiment will be less than 1000 by a number that is equal to the duration of an individual time-slot (i.e., one micro-second) divided into the total time delay associated with a signal traveling twice the distance to the telephone instrument located farthermost away from the MPBX. If that distance were to be 10,000 feet, the number of available communication channels would be 980 instead of 1000.

(s) A different approach to implementing the above-described alternatively preferred embodiment involves the use of two separate fibre-loops: one loop for receiving the signals entered by the various telephone instruments and for transmitting these signals downstream toward the MPBX; and one loop for receiving signals from the delay means to transmit these signals to the various telephone instruments. By so using two separate fibre-loops, there will be no need to require of each telephone instrument to receive a relatively weak signal and to emit a much stronger signal.

(t) In the above-described alternatively preferred embodiment, the analogue telephone signal has to be compressed into one-micro-second-long time-slots updated once each millisecond; which implies a degree of "time-compression" of 1000:1 versus only 100:1 for the time-compression associated with the basic preferred embodiment.

(u) A key recognition underlying the invention herein described relates to the fact that the overwhelming percentage of electric power distribution within a building is done for the purpose of lighting, especially so in commercial buildings. Thus, the lighting function becomes the chief determinant of where and how electric power conductors are distributed within a building. By further recognizing that a properly designed telephone signal distribution system can be installed as permanently as can the electric power distribution system without losing any of the required flexibility and that the signal distribution conductors can in fact be safely be laid down alongside the electric power conductors, it becomes clear that doing so provides for substantial overall benefits in the form of reduced installation cost, decreased complexity and increased flexibility.

In particular, the relatively heavy gauge electric power distribution conductors may be reduced in number and total lengths for two basic reasons: (i) load control (such as ON/OFF switching of lights) can be accomplished remotely from the load without actually stringing the electric power conductors to the point of control (i.e., to the wall switch); and (ii) due to increased protection against fire initiation hazards, it becomes feasible to distribute electric power via a single pair of heavy gauge distribution conductors as contrasted with distributing electric power via a multiplicity of pairs of distribution conductors all radiating out from a central power panel.

Thus, in sum total, instant invention relates to the proposition of distributing both electric power and communication signals along a single common main signal and electric power conducting means, branching off along the way from this common main signal and electric power conducting means at whatever points convenient. Thus, instant invention relates to providing in a building the equivalent of what for automobiles has become known as "a single wire power distribution system".

(v) It is anticipated that TV signals as well may be distributed via instant combined signal electric power distribution system.

(w) As instant invention relates to a combined signal and electric power distribution system and various key features thereof, information on how to accomplish some of the details of these key features has been omitted for sake of brevity and clarity. However, based on the description provided, all the features indicated are readily attainable by a person having ordinary skill in the art pertinent hereto on basis of well known prior art.

For instance, such a person would readily know how to attain the functions associated with the signal transceiver means STM2 installed in suspended ceiling SC and connected with main signal conducting means MSCM1 and alternative power conducting means APCM1; which signal transceiver means is continuously transmitting and receiving on all of the communication channels provided by main signal conducting means MSCM1. Thus, as a person P comes into office OF carrying his own personal cord-less telephone CT1, he is—via receive/transmit antenna RTA2 and signal tranceiver means STM2—automatically (i.e., without taking any express log-in action) in contact with his own personally designated communication channel on main signal conducting means MSCM1.

(x) One of the key concepts underlying instant invention is that of using information transmission and processing for keeping accurate track of the flow of electric power, thereby to permit accurate control thereof. As a consequence, any substantive unauthorized power dissipations are detected and prevented, thereby providing for an exceptionally high degree of protection against electrical fire initiation hazards.

In fact, outside of the authorized points of power extraction (ex: lighting fixture LF1), the total power distribution system may be considered as Class-3 electrical circuit.

DESCRIPTION OF THE PREFERRED TELEPHONE INSTRUMENT

Details of Construction of the Preferred Telephone Instrument

Figure 8:
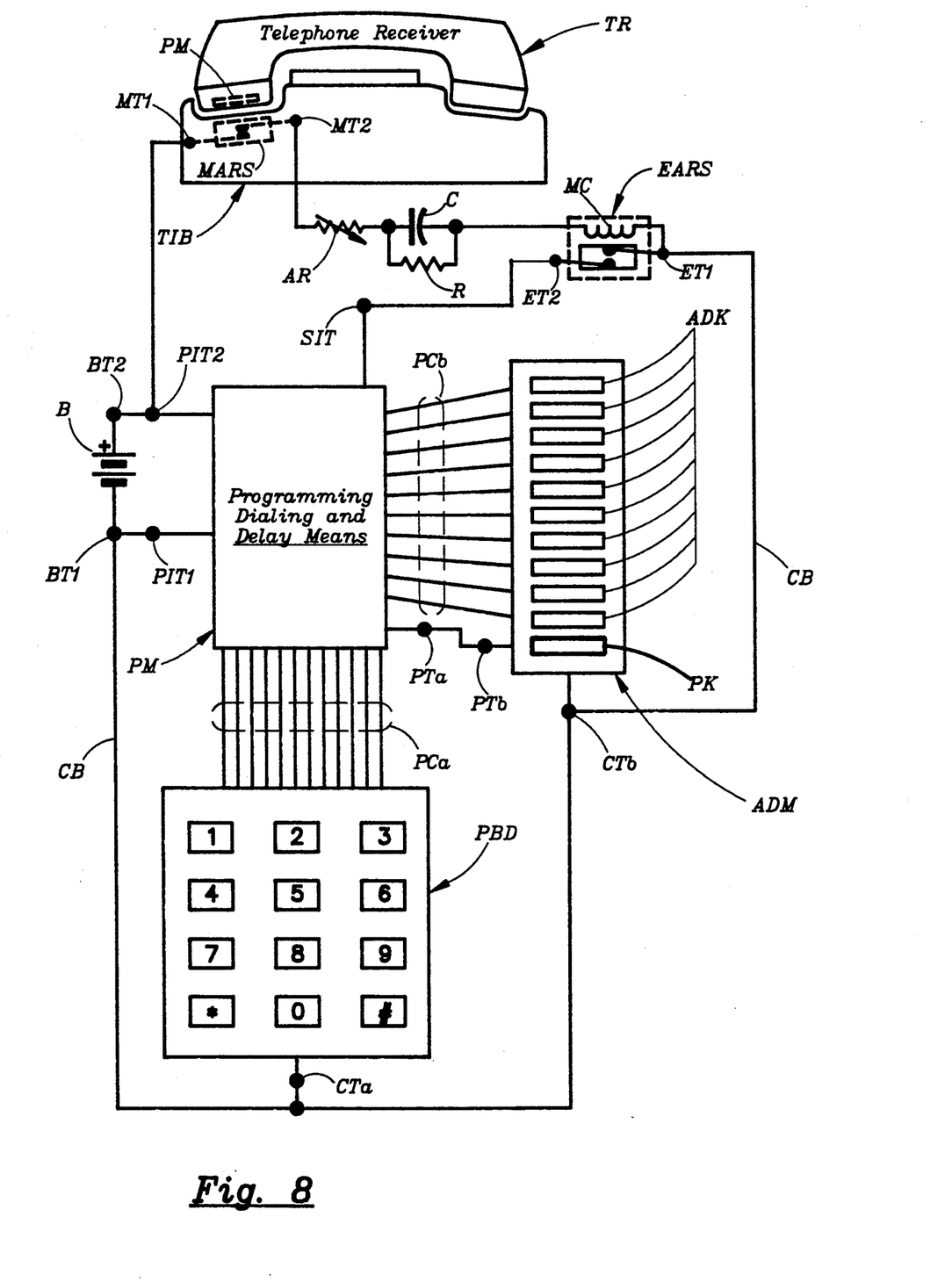
FIG. 8 schematically shows the preferred embodiment of a telephone instrument for use in the preferred system of FIG. 4.

FIG. 8 schematically illustrates the preferred embodiment of a telephone instrument for use in the power and signal distribution system of FIG. 4.

In FIG. 8, a telephone receiver TR is shown resting in its ordinary not-in-use position on a telephone instrument base TIB. Built into the ear piece (or, alternatively, into the mouth piece) of the telephone receiver is a permanent magnet PM, shown in phantom outline; which permanent magnet PM is aligned with a normally-closed magnetically-activated reed switch MARS, also shown in phantom outline, located in the telephone instrument base TIB directly underneath permanent magnet PM. Switch MARS has two switch terminals MT1 and MT2.

An ordinary push-button telephone dial is shown as PBD; which dial PBD has a common terminal CTa connected with a common bus CB, as well as plural output terminals each connected via plural conductors PCa with a corresponding input terminal of a programming, dialing and delay means PM.

Common bus CB is connected with a power input terminal PIT1 of programming means PM as well as with battery terminal BT1 of a battery B, whose other battery terminal BT2 is connected with power input terminal PIT2 of programming means PM as well as with terminal MT1 of switch MARS. Common bus CB is also connected with common terminal CTb of an auxiliary dialing means ADM as well as with switch terminal ET1 of normally-open electrically-actuated reed switch EARS. Terminal ET1 is connected with terminal MT2 of switch MARS by way of magnetizing coil MC (contained within switch EARS), a parallel-combination of a capacitor C and a resistor R, and an adjustable resistor AR. The other switch terminal of switch EARS is designated ET2 and is connected with a special input terminal SIT of programming means PM.

Auxiliary dial means ADM has plural output terminals, each connected via plural conductors PCb with a corresponding input terminal of programmming means PM.

Programming means PM has a program terminal PTa that is connected with a corresponding program terminal PTb on auxiliary dialing means ADM; which dialing means has a program key PK as well as plural automatic-dial keys ADK.

Details of Operation of the Preferred Telephone Instrument

The telephone arrangement illustrated in FIG. 8 functions as an ordinary push-button telephone having ordinary push-button dialing via push-button dial PBD as well as automatic dialing of plural pre-programmable telephone numbers via dial means ADM.

Of course, by way of connections and conductors not shown, programming means PM is connected in circuit with the electrical terminals of the telephone instrument represented by base TIB and receiver TR; which telephone instrument, in turn, is connected with an ordinary telephone line.

Aside from providing for the usual functions of manual and automative dialing of telephone numbers, programming means PM also provides for a function whereby—whenever its special input terminal SIT is activated—it will cause a certain special (pre-programmable) telephone number to be dialed, but only after a brief time-delay, such as about two seconds.

Activation of special input terminal SIT occurs whenever reed switch EARS momentarily closes. The momentary closing of reed switch EARS occurs each time telephone receiver TR is removed from its usual not-in-use position. More particularly, by action of permanent magnet PM, whenever telephone receiver TR rests in its ordinary not-in-use position, reed switch MARS is actuated and therefore exists in the state of being an open circuit (i.e., reed switch MARS is then open). However, as soon as telephone receiver TR is lifted from its ordinary not-in-use position, reed switch MARS reverts to its normal non-actuated state, which is that of being a short circuit (i.e., reed switch MARS is then closed). Upon closing of reed switch MARS, the battery voltage from battery B will be applied across the magnetizing coil MC of reed switch EARS, which therefore will become actuated. Thereafter, reed switch EARS will remain actuated until capacitor C reaches a certain state of charge, at which point reed switch EARS will again become non-actuated. The time period required for capacitor C to reach this certain state of charge is determined by capacitance of C as well as by the internal resistance of magnetizing coil MC as added-to the resistance of adjustable resistor AR.

Once telephone receiver TR is placed back into its ordinary not-in-use position, reed switch MARS again gets activated thereby opening the connection between magnetizing coil MC and battery B. From that point in time, the charge on capacitor C will drain away via resistor R, thereby to be ready to cause momentary activation of reed switch EARS at some later time when telephone receiver TR is again lifted.

A person would use the telephone instrument of FIG. 8 in the following manner.

(1) By merely removing the telephone receiver from its usual not-in-use position, after a delay of about two seconds, a certain pre-programmed (partial or complete) telephone number will automatically be dialed; thereby providing the function of totally automatic dialing of this certain telephone number; which certain telephone number could be an emergency telephone number, or it could be a very-frequently-dialed telephone number, or it could be a common part or pre-fix of some frequently-dialed telephone numbers (such as the three-digit pre-fix number in a given local calling area).

(2) In case the certain pre-programmed telephone number is only a partial telephone number (such as a pre-fix), all that is necessary for the person to do—after having lifted the receiver—is to complete the dialing of the desired telephone number by keying-in the additional numerals on the regular pushbutton dial (PBD).

(3) In case the person wishes to reach some other telephone number (i.e., other than the desired telephone number), he merely proceeds to dial that other telephone number, either by pressing one of the pre-programmed automatic-dial keys (ADK) within the two second delay period, or by keying-in that other telephone number in a regular manner via the regular pushbutton dial (PBD), starting this dialing procedure before the end of the two second delay period.

(4) To program the certain (partial or complete) telephone number into the programming means (PM), it is necessary to leave the telephone receiver in its usual not-in-use position and then, in chronological order, to: (i) momentarily press programming key PK; (ii) key-in the partial or complete telephone number on the keys of the regular push-button dial (PBD); and (iii) again press programming key PK.

(5) To program some other (partial or complete) telephone number into the programming means (PM), it is necessary to leave the telephone receiver in its usual not-in-use position and then, in chronological order, to: (i) momentarily press programming key PK; (ii) momentarily press one of the plural automatic dial keys (ADK); (iii) key-in the partial of complete telephone number on the keys of the regular push-button dial (PBD); and (iv) again press programming key PK.

Additional Comments Regarding Telephone Instrument (y) In FIG. 4, many of the details of the telephone instrument of FIG. 4 have been omitted for the reasons that: (i) they form no part of the present invention; and (ii) to a person having ordinary skill in the art pertinent hereto, they represent obvious subject matter and would, if included, merely hinder the ready understandning of the present invention.

(z) Instead of using battery B for powering programming means PM and/or for powering reed switch EARS, DC voltage avaliable from the telephone line may be used.

Moreover, the function attained by way of the permanent magnet (PM) and the reed switches (MARS, EARS) may instead be provided by utilizing the signal and/or voltage that becomes available within an ordinary telephone instrument (connected with an ordinary telephone line) whenever the telephone receiver is removed from its ordinary not-in-use position.

I claim:

1. In an office or similar room having a ceiling, the improvement comprising:
    signal conduction means connected with a telephone or similar communication system;
    a first transceiver means having a first antenna means mounted at or near the ceiling; the transceiver means being functionally connected with the telephone or similar communication system by way of the signal conduction means;
    a second transceiver means having a second antenna means; the second transceiver means being disposed within the room and, via its second antenna means, being in wireless connection with the first transceiver means; and
    signal source and utilization means connected with the second transceiver means and, by way of wireless connection with the first transceiver means, being in functional connection with the telephone utility system.

2. The improvement of claim 1 wherein: (i) the ceiling includes a lighting system operative to provide a lighting function; (ii) the lighting system has control input means operative, on receipt of a control signal at a control input, to control the lighting function; (iii) the control input means is connected with the signal conduction means; and (iv) the signal conduction means is operative to provide the control signal, thereby to control the lighting function.

3. In a building intended for human occupancy, a combination characterized by comprising:
    a lighting system having power conductor means connected with an ordinary electric utility power line and being operative to provide a lighting function; the lighting system having control input means operative, in response to receiving a control signal at a control input means, to control this lighting function;
    a communication system having signal conductor means connected with an ordinary telephone utility system; the signal conductor system being connected with the control input means as well as with other signal utilization means.

4. The combination of claim 3 additionally characterized by including: (i) first transceiver means connected with the signal conduction means; and (ii) second transceiver means connected by wireless means with the first transceiver means.

5. The combination of claim 3 additionally characterized by the power conductor means being integrally combined with the signal conductor means in such manner as to constitute a single cable entity including both the power conductor means and the signal conductor means.

6. The combination of claim 5 wherein the single cable entity also includes an auxiliary conductor means connected with a source of auxiliary power operative to supply power even in situations when no power is being supplied from the electric utility power line.

7. The combination of claim 3 further characterized by including power safety control means having safety control means operative to prevent any substantive amount of power from being extracted from the power conductor means except when being provided with an enabling signal at an enabling control input.

8. In a building having a room intended for human occupancy, the improvement comprising:
    signal conduction means connected with a telephone utility signal line and functional to conduct plural signals between the telephone utility signal line and a signal terminal means disposed in or adjacent the room;
    main transceiver means connected with the signal terminal means and operative to receive and transmit the plural signals via a main antenna means;
    first remote transceiver means disposed within the room and operative to receive and transmit a first part of the plural signals via a first remote antenna means;
    first signal source and utilization means connected with the first remote transceiver means and functional to generate and/or utilize the first part of said signals;
    second remote transceiver means disposed within the room and operative to receive and transmit a second part of the plural signals via a second remote antenna means; and
    second signal source and utilization means connected with the second transceiver means and functional to generate and/or utilize the second part of the plural signals.

9. The improvement of claim 8 wherein the main antenna means is fastened to the ceiling.

10. In a building having a room with walls and ceiling, the improvement comprising:

signal conduction means connected with a telephone utility signal line and functional to conduct signals between the telephone utility signal line and a signal terminal means disposed in or adjacent the room;

main transceiver means connected with the signal terminal means and operative to receive and transmit at least part of said signals via a main antenna means; the main antenna means being attached to the ceiling or walls of the room;

remote transceiver means disposed within the room and operative to receive and transmit at least part of said signals via a remote antenna means; and signal source and utilization means connected with the remote transceiver means and functional to generate and/or utilize at least a part of said signals.

11. The improvement of claim 10 wherein an electric power conduction means is integrally combined with the signal conduction means.

12. The improvement of claim 10 wherein: (i) the signal conduction means is integrally combined with a power conduction means operative to permit electric power to flow between an electric utility power line and a power utilization means; (ii) the flow of electric power to the power utilization means is controlled by a control means; (iii) the control means has a control signal input means operative, on receipt of a certain control signal, to control the amount of power flowing to the power utilization means; (iv) the control signal input means being connected with the signal conduction means; and (v) the signal conduction means is at times operative to provide the certain control signal to the control signal input means.

13. Within a building having rooms intended for humans occupancy, an in-building telephone system comprising:

in at least one of the rooms, a first main transceiver means connected via first signal transmission means with a telephone utility system, such as a local telephone company; the first main transceiver means having a first main antenna mounted to the ceiling or to one of the walls of said one of the rooms; the first main transceiver means being operative to: (i) receive first telephone signals from the telephone utility system via the first signal transmission means; (ii) transmit the first telephone signals from the first main antenna; (iii) receive second telephone signals from the first main antenna; and (iv) convey the second telephone signals to the telephone utility system via the first signal transmission means; and a first remote transceiver means having a first remote antenna connected in wireless communication with the first main antenna and operative to receive a first part of the first telephone signals from the first main antenna and to supply a first part of the second telephone signals to the first main antenna.

14. The telephone system of claim 13 additionally comprising:

a second remote transceiver means having a second remote antenna connected in wireless communication with the first main antenna and operative to receive a second part of the first telephone signals from the first main antenna and to supply a second part of the second telephone signals to the first main antenna.

15. Within a building having rooms intended for human occupancy, an in-building telephone system comprising:

in at least one of the rooms, a first main transceiver means connected via first signal transmission means with a telephone utility system, such as a local telephone company; the first main transceiver means having a first main antenna and being operative to: (i) receive first telephone signals from the telephone utility system via the first signal transmission means; (ii) transmit the first telephone signals from the first main antenna; (iii) receive second telephone signals from the first main antenna; and (iv) convey the second telephone signals to the telephone utility system via the first signal transmission means;

a first remote transceiver means having a first remote antenna connected in wireless communication with the first main antenna and operative to receive a first part of the first telephone signals from the first main antenna and to supply a first part of the second telephone signals to the first main antenna; and a second remote transceiver means having a second remote antenna connected in wireless communication with the first main antenna and operative to receive a second part of the first telephone signals from the first main antenna and to supply a second part of the second telephone signals to the first main antenna.

16. The telephone system of claim 15 wherein the first part of the first telephone signal is different from the second part of the first telephone signal.

17. The telephone system of claim 15 wherein the signal transmission means includes signal processing means operative to cause signals supplied to the first main transceiver means via the first signal transmission means to be different from signals being supplied from the telephone utility system to the first signal transmission means.

* * * * *